United States Patent [19]

Harder

[11] Patent Number: 4,502,197

[45] Date of Patent: Mar. 5, 1985

[54] SEAL RETAINER INSTALLING AND REMOVING TOOL

[76] Inventor: W. Dale Harder, 3744 Kelly St., Fort Myers, Fla. 33901

[21] Appl. No.: 477,832

[22] Filed: Mar. 22, 1983

[51] Int. Cl.[3] .............................................. B23P 19/04

[52] U.S. Cl. ...................................................... 29/259

[58] Field of Search ................. 29/259, 257, 258, 260, 29/261, 262, 251

[56] References Cited

U.S. PATENT DOCUMENTS

| | | | |
|---|---|---|---|
| Re. 24,626 | 4/1959 | Williams . | |
| 222,646 | 12/1879 | Andrews et al. | 29/260 |
| 664,565 | 12/1900 | Livingood | 29/259 |
| 1,280,233 | 10/1918 | Jones | 29/259 |
| 1,347,809 | 7/1920 | Frisz et al. | 29/259 |
| 1,893,414 | 1/1933 | Johnson et al. . | |
| 2,230,918 | 2/1941 | Walter | 29/259 |
| 2,277,346 | 3/1942 | Nichols et al. . | |
| 2,310,639 | 2/1943 | Johnson | 29/262 |
| 3,057,052 | 10/1962 | Robertson . | |
| 3,059,327 | 10/1962 | Burrows . | |
| 3,467,811 | 9/1969 | Consoletti . | |
| 4,120,082 | 10/1978 | Bond . | |

FOREIGN PATENT DOCUMENTS

| | | | |
|---|---|---|---|
| 1122008 | 1/1962 | Fed. Rep. of Germany | 29/259 |
| 1117686 | 1/1955 | France | 29/251 |

*Primary Examiner*—Robert C. Watson
*Attorney, Agent, or Firm*—Benjamin P. Reese, II

[57] ABSTRACT

A tool for installing and removing a seal retainer of the type found on the drive axles of certain front wheel drive automobiles. The tool comprises a C-ring for engaging a seal retainer and a crossbar parallel to the C-ring. A pair of spacers are rigidly attached to and between the C-ring and crossbar to form a frame. A thumbscrew is operatively positioned in a threaded hole through the crossbar for engaging a shaft while installing or removing a seal retainer. The crossbar of the tool is tapped with a mallet to apply the force which is necessary to remove a seal retainer. The force which is necessary to install a seal retainer is applied by tightening the thumbscrew.

3 Claims, 9 Drawing Figures

SEAL RETAINER INSTALLING AND REMOVING TOOL

BACKGROUND OF THE INVENTION

This invention relates generally to tools for servicing the drive axles of front wheel drive automobiles, and, more particularly, to a new and improved tool for installing and removing the seal retainers used in connection with the constant velocity joint assemblies and outboard seals of certain front wheel drive automobiles.

The drive axles of many front wheel drive automobiles require servicing during the life of such automobiles. During such servicing, it is usually necessary to install and remove various seal retainers. The seal retainers found on the drive axles of front wheel drive automobiles manufactured by the General Motors Corporation since 1979 have proved to be particularly troublesome to install and remove without damage to either the seal or the seal retainer, or both, when installing and removing such seal retainers in accordance with that manufacturer's recommended service methods. Furthermore, it is not possible to install seal retainers while the applicable seals and assemblies are in place on such automobiles using that manufacturer's recommended service methods.

It is desirable to have a tool for installing and removing seal retainers found on the drive axles of front wheel drive automobiles, particularly those manufactured by the General Motors Corporation since 1979, without damaging the seal retainer or any other component of the drive axle. Preferably, such a tool should be capable of installing and removing the seal retainers used in connection with the constant velocity joint assemblies and outboard seals of such automobiles while such assemblies and such seals are in place on such automobiles. Such a tool should also preferably be adaptable for use in installing and removing such seal retainers of the type found on both full size and smaller size front wheel drive automobiles manufactured by the General Motors Corporation since 1979. It is not believed that the prior art provides such a tool.

SUMMARY OF THE INVENTION

The present invention provides a tool for installing and removing seal retainers of the type found on the drive axles of front wheel drive automobiles, particularly those manufactured by the General Motors Corporation since 1979. The tool of the present invention is particularly suitable for use in installing and removing the seal retainers which are used in connection with the constant velocity joint assemblies and outboard seals of such automobiles while such assemblies and such seals are in place on such automobiles.

The tool of the present invention comprises a flat C-ring for engaging a seal retainer and a flat crossbar positioned parallel to the C-ring. A pair of elongated spacers are rigidly attached to and between the C-ring and crossbar. A thumbscrew is operatively positioned in a threaded hole through the crossbar for engaging the outer end of shaft of a constant velocity joint assembly. A C-ring adaptor is provided to nestle in the C-ring when it is desired to use the tool to install or remove a smaller seal retainer.

The tool is positioned around the shaft of a constant velocity joint assembly such that its C-ring engages the seal retainer on such assembly and its associated outboard seal. The crossbar of the tool is tapped with a mallet to apply force to remove the seal retainer. The thumbscrew of the tool is tightened to apply force to install the seal retainer. A step-plate adaptor is provided for use with the tool is it is desired to use the tool to install a seal retainer on a tri-pot joint assembly and seal.

These and many other advantages, features and objects of the present invention will be apparent from the following Brief Description of the Drawings, Detailed Description of the Preferred Embodiment and Claims, and the accompanying Drawings.

DETAILED DESCRIPTION OF THE PREFERRED EMBODIMENT

Figure 3:
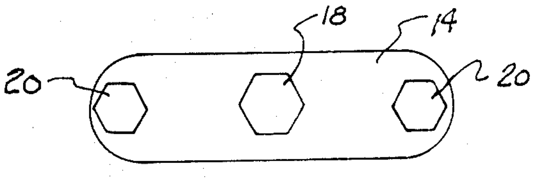
FIG. 3 is a top plan view of the crossbar, thumbscrew, and connecting bolts of the seal retainer installing and removing tool of the present invention.

The preferred embodiment of the seal retainer installing and removing tool of the present invention is illustrated in FIGS. 1-9.

Referring to FIGS. 1-9, the tool 10 which is illustrated comprises an essentially flat C-ring 12 for engaging a seal retainer, an essentially flat crossbar 14 positioned parallel to the C-ring 12, and a pair of parallel, elongated spacers 16 positioned between the C-ring 12 and crossbar 14. A thumbscrew 18 is operatively positioned in a threaded hole through the center of the crossbar 14 for engaging the outer end of the shaft of a constant velocity joint assembly, particularly such an assembly of the type which is found on front wheel drive automobiles manufactured by the General Motors Corporation since 1979.

Figure 1:
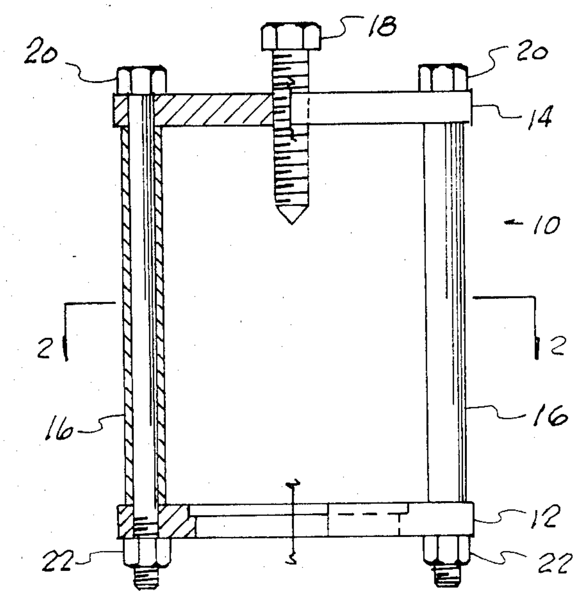
FIG. 1 is a front elevational view, in partial section taken along line 1—1 in FIG. 2, of the seal retainer installing and removing tool of the present invention.
Figure 6:
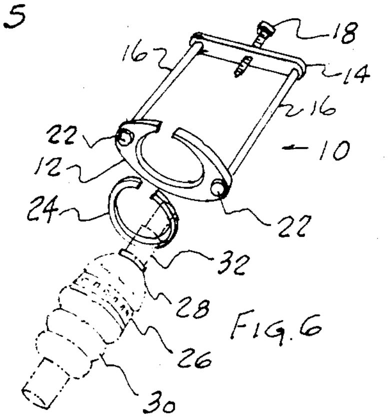
FIG. 6 is a perspective view of the seal retainer installing and removing tool of the present invention, a C-ring adaptor for that tool, and a constant velocity assembly and outboard seal with a seal retainer installed.
Figure 9:
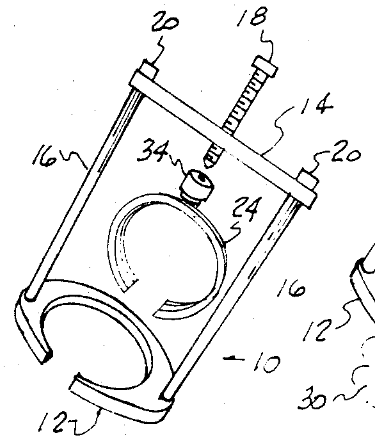
FIG. 9 is a perspective view of the seal retainer installing and removing tool of the present invention, a C-ring adaptor for that tool, and a step-plate adaptor which enables the tool to be used for installing seal retainers on tri-pot joint assemblies and seals.

The spacers which are illustrated in FIGS. 2–9 are formed by cutting steel tubes of the desired diameter to the desired length. As best illustrated in FIG. 1, each of the spacers 10 is rigidly attached to and between the C-ring 12 and crossbar 14 to create a frame for the tool 10 by passing a bolt 20 through a hole through the crossbar 14, the bore of the spacer 16 and a hole through the C-ring 12, and then fastening a nut 22 on the threaded end of the bolt 20. Of course, each of the spacers 10 can be formed and rigidly attached to and between the C-ring 12 and crossbar 14 by alternate means, such as cutting steel rods of the desired diameter to the desired length and force fitting or welding opposite ends of such rods into holes in the opposed surfaces of the C-ring 12 and crossbar 14.

In the manufacture of the tool 10, commercially available hardened steel tubes of the desired diameter can be cut to the desired length to form the spacers 16. The thumbscrew 18, bolts 20 and nuts 22 are commercially available as haredened steel components. Conventional manufacturing processes, such as casting, forging and machining, can be used to form the C-ring 12 and crossbar 14 as hardened steel components. While stainless steel could be used for the various components of the tool 10, it is not necessary since the grease and oil present in the intended work environment of the tool 10 will protect the tool 10 from corrosion.

Figure 4:
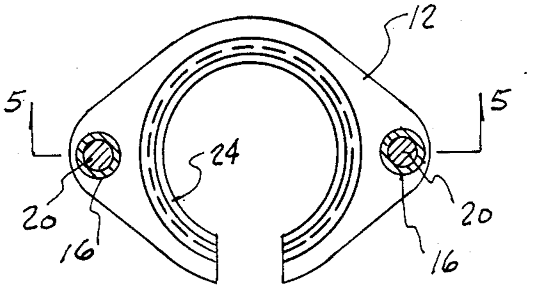
FIG. 4 is a plan view substantially identical to the plan view in FIG. 2 but further illustrating a C-ring adaptor nestled in the C-ring of the seal retainer installing and removing tool of the present invention.
Figure 2:
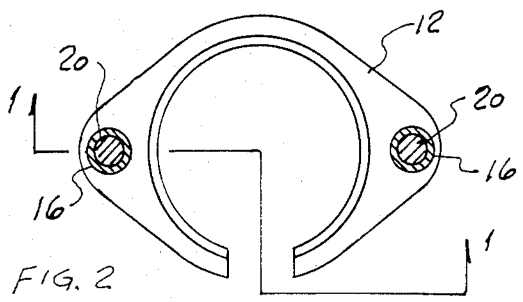
FIG. 2 is a plan view, in partial section taken along line 2—2 in FIG. 1, illustrating the C-ring of the seal retainer installing and removing tool of the present invention.
Figure 5:
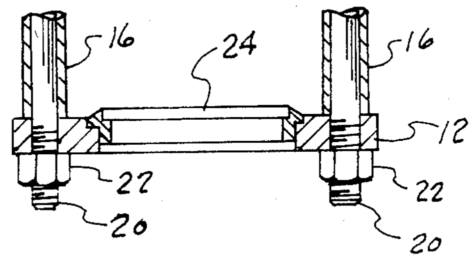
FIG. 5 is a front elevational view, in partial section taken along line 5—5 in FIG. 4, further illustrating the C-ring adapter nestled in the C-ring of the seal retainer installing and removing tool of the present invention.

Having described the structure of the tool 10, its principal methods of use will now be described. Referring to FIGS. 1, 2, 3, 7 and 8, the tool 10 is dimensioned for installing and removing seal retainers of the type found on full size front wheel drive automobiles manufactured by the General Motors Corporation since 1979. If it is desired to use the tool 10 for installing and removing seal retainers of the type found on smaller size front wheel drive automobiles manufactured by General Motors Corporation since 1979, a hardened steel C-ring adapter 24 can be nestled in the C-ring 12 by drop or force fitting as best illustrated in FIGS. 4 and 5. At the present time, seal retainers of the type found on front wheel drive automobiles of the type manufactured by the General Motors Corporation are not found on the front wheel drive automobiles of other manufacturers.

Figure 7:
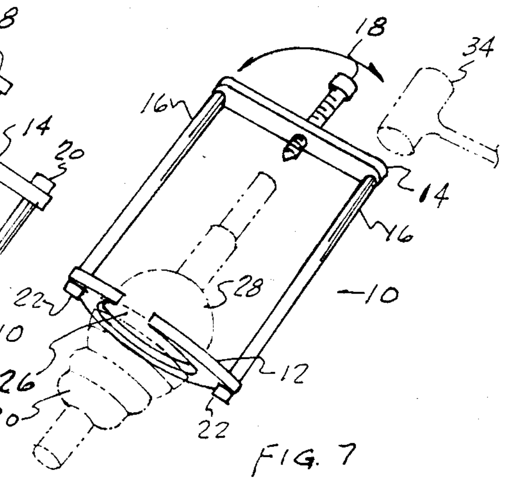
FIG. 7 is a perspective view illustrating one method of use of the seal retainer installing and removing tool of the present invention for removing a seal retainer by tapping the cross bar with a mallet.

When it is desired to remove a seal retainer 26 from a constant velocity joint assembly 28 and outboard seal 30, the tool 10 is positioned around the shaft 32 of the constant velocity joint assembly 28 such that the C-ring 12, with or without a C-ring adaptor 24 as appropriate, engages the seal retainer 26. The top surface of the crossbar 14 is tapped with a mallet 34 near both of its ends as illustrated in FIG. 7 to apply force to the seal retainer 26. With this method of use of the tool 10, the seal retainer 26 is easily removed without damage to the seal retainer 26 or any other component of the constant velocity joint assembly 28 and outboard seal 30.

Figure 8:
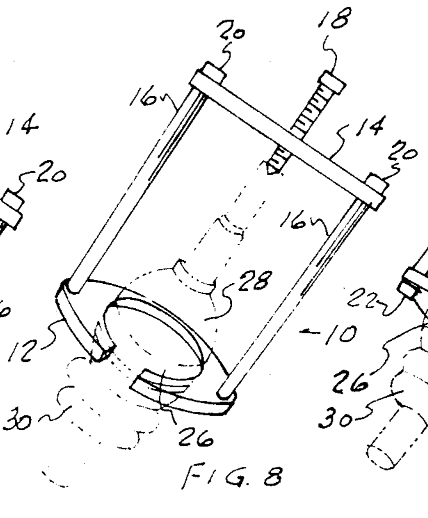
FIG. 8 is a perspective view illustrating one method of use of the seal retainer installing and removinng tool of the present invention for installing a seal retainer by tightening the screw means of the tool.

When it is desired to install a seal retainer 26 on a constant velocity joint assembly 28 and outboard seal 30, the tool 10 is positioned around the shaft 32 of the constant velocity joint assembly 28 with the outboard seal 30 and seal retainer 26 appropriately positioned and the C-ring 12, with or without a C-ring adaptor 24 as appropriate, engaging the seal retainer 26. The thumbscrew 18 is tightened against the end of the shaft 32 as illustrated in FIG. 8 to apply force to the seal retainer 26. Preferably, an air or hand operated wrench is used to tighten the thumbscrew 18.

Since the open arrangement of the C-ring 12 permits the tool 10 to be used for installing and removing the seal retainers 26 used in connection with constant velocity joint assemblies 28 and outboard seals 30 while such assemblies 28 and such seals 30 are in place on front wheel drive automobiles, the tool 10 is particularly desirable for installing and removing such seal retainers. Nevertheless, the tool 10 can be used for installing seal retainers on tri-pot joint assemblies and seals at a work bench. When installing such seal retainers, the step-plate adaptor 34 illustrated in FIG. 9 must be used with the tool 10 for the thumbscrew 18 to properly engage the tri-pot housing.

While the present invention has been disclosed in connection with its preferred embodiment, it should be understood that there may be other embodiments which fall within the spirit and scope of the invention as defined by the following claims.

I claim:

1. A tool for installing and removing seal retainers of the type used in connection with constant velocity joint assemblies and associated outboard seals on the drive axles of front wheel drive automobiles, comprising:

an essentially flat C-ring for engaging the seal retainer to be installed or removed, said C-ring being provided with a recessed portion along its circumference and an opening there through which is no larger than necessary for positioning said C-ring around the shaft of the constant velocity joint assembly with which the seal retainer to be installed or removed is associated such that said recessed portion of said C-ring engages said seal retainer along essentially its entire circumference;

an essentially flat crossbar positioned parallel to said C-ring;

a pair of identical, parallel, elongated spacers positioned perpendicular to and between said C-ring and said crossbar, each of said spacers having one of its ends attached to said C-ring and the other of its ends attached to said crossbar; and a thumbscrew operatively positioned in a threaded hole through said crossbar for engaging the free end of the shaft of the constant velocity joint assembly with which the seal retainer to be installed or removed is associated.

2. A tool as recited in claim 1, further comprising an essentially flat C-ring adaptor which nestles in said C-ring to adapt said tool for installing and removing a smaller sized seal retainer, said adaptor being provided with an opening there through which is no larger than necessary for positioning said adaptor around the shaft of the constant velocity joint assembly with which the seal retainer to be installed or removed is associated such that said adaptor engages said seal retainer along essentially its entire circumference.

3. A tool as recited in claim 1, further comprising an essentially flat C-ring adaptor which nestles in said C-ring to adapt said tool for installing and removing a smaller sized seal retainer, said adaptor being provided with a recessed portion along its circumference and an opening there through which is no larger than necessary for positioning said adaptor around the shaft of the constant velocity joint assembly with which the seal retainer to be installed or removed is associated such that said recessed portion of said adaptor engages said seal retainer along essentially its entire circumference.

* * * * *

UNITED STATES PATENT AND TRADEMARK OFFICE

CERTIFICATE OF CORRECTION

PATENT NO. : 4,502,197

DATED : March 5, 1985

INVENTOR(S) : W. Dale Harder

It is certified that error appears in the above-identified patent and that said Letters Patent is hereby corrected as shown below:

In Column 1, Line 61, insert the word ---a--- between the words "of" and "shaft".

In Column 2, Line 4[illegible], the first word "is" should read --if--.

In Column 2, Line 30, the word "adapter" should read --adaptor--.

In Column 2, Line 42, the word "removinng" should read --removing--.

In Column 3, Line 20, the word "haredened" should read --hardened--.

Signed and Sealed this

*Eighteenth* Day of *June 1985*

[SEAL]

*Attest:*

DONALD J. QUIGG

*Attesting Officer* *Acting Commissioner of Patents and Trademarks*